United States Patent
Gaertner et al.

(10) Patent No.: US 11,053,935 B2
(45) Date of Patent: Jul. 6, 2021

(54) PISTON PUMP, IN PARTICULAR AS A PRESSURE GENERATOR IN AN ELECTRONICALLY SLIP-CONTROLLABLE VEHICLE BRAKE SYSTEM

(71) Applicant: Robert Bosch GmbH, Stuttgart (DE)

(72) Inventors: Oliver Gaertner, Abstatt (DE); Oliver Hennig, Obersulm (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 16/078,913

(22) PCT Filed: Jan. 18, 2017

(86) PCT No.: PCT/EP2017/050977
§ 371 (c)(1),
(2) Date: Aug. 22, 2018

(87) PCT Pub. No.: WO2017/153072
PCT Pub. Date: Sep. 14, 2017

(65) Prior Publication Data
US 2019/0048870 A1   Feb. 14, 2019

(30) Foreign Application Priority Data

Mar. 11, 2016   (DE) .................... 10 2016 204 002.2

(51) Int. Cl.
*F04B 53/10* (2006.01)
*F04B 1/0452* (2020.01)
(Continued)

(52) U.S. Cl.
CPC ........ *F04B 53/1002* (2013.01); *B60T 8/4031* (2013.01); *B60T 13/16* (2013.01);
(Continued)

(58) Field of Classification Search
CPC ........ F16K 1/14; F04B 53/1002; F04B 19/22; B60T 2270/10; B60T 8/4031; B60T 13/16
See application file for complete search history.

(56) References Cited

U.S. PATENT DOCUMENTS 6,302,663 B1 * 10/2001 Schuller ................ B60T 8/4031
417/470
6,514,056 B1 * 2/2003 Schuller ................ B60T 8/4031
417/470
(Continued)

FOREIGN PATENT DOCUMENTS

DE         199 24 774.9 A1    11/2000
DE   10 2008 041 383.6 A1     2/2010
(Continued)

OTHER PUBLICATIONS

International Search Report corresponding to PCT Application No. PCT/EP2017/050977, dated Apr. 21, 2017 (German and English language document) (8 pages).

*Primary Examiner* — Charles G Freay
*Assistant Examiner* — Lilya Pekarskaya
(74) *Attorney, Agent, or Firm* — Maginot, Moore & Beck LLP

(57) ABSTRACT

A piston pump, in particular as a pressure generator in an electronically slip-controllable vehicle brake system, includes a pump cylinder, a drivable piston, a pump working chamber, a valve space, and a valve. The drivable piston is slidably accommodated in the pump cylinder. The pump working chamber is bounded by the piston and the pump cylinder. The valve controls a supply of pressure medium to the pump working chamber. The valve has a conical valve seat and a closing element having a domed shell section that interacts with the valve seat. The valve seat surrounds the valve space, into which the closing element plunges, at least (Continued)

up to an imaginary center point of the domed shell section, when the valve seat is closed or open.

7 Claims, 2 Drawing Sheets

(51) Int. Cl.
    *B60T 8/40*     (2006.01)
    *B60T 13/16*     (2006.01)
    *B60T 17/02*     (2006.01)
    *F04B 19/22*     (2006.01)
    *F16K 1/14*     (2006.01)

(52) U.S. Cl.
    CPC ............ *B60T 17/02* (2013.01); *F04B 1/0452* (2013.01); *F04B 19/22* (2013.01); *F16K 1/14* (2013.01); *B60T 2270/10* (2013.01)

(56) References Cited

U.S. PATENT DOCUMENTS

| | | | | |
|---|---|---|---|---|
| 2002/0036014 A1* | 3/2002 | De Matthaeis | ....... | F04B 53/101 |
| | | | | 137/539 |
| 2002/0155008 A1* | 10/2002 | Hauser | ................ | F04B 53/166 |
| | | | | 417/313 |
| 2006/0177326 A1* | 8/2006 | Harada | ................ | F04B 1/0452 |
| | | | | 417/470 |
| 2007/0183911 A1* | 8/2007 | Maeda | ................ | F04B 1/0421 |
| | | | | 417/470 |
| 2008/0292473 A1 | 11/2008 | Marino et al. | | |

FOREIGN PATENT DOCUMENTS

| | | |
|---|---|---|
| DE | 10 2013 210 041.8 A1 | 12/2014 |
| DE | 10 2015 206 242.2 A1 | 10/2015 |
| EP | 1 185 794 B1 | 3/2002 |
| EP | 1 701 032 A1 | 9/2006 |
| JP | S46-034955 Y | 12/1971 |
| JP | 2000-120528 A | 4/2000 |

\* cited by examiner

PISTON PUMP, IN PARTICULAR AS A PRESSURE GENERATOR IN AN ELECTRONICALLY SLIP-CONTROLLABLE VEHICLE BRAKE SYSTEM

This application is a 35 U.S.C. § 371 National Stage Application of PCT/EP2017/050977, filed on Jan. 18, 2017, which claims the benefit of priority to Serial No. DE 10 2016 204 002.2, filed on Mar. 11, 2016 in Germany, the disclosures of which are incorporated herein by reference in their entirety.

BACKGROUND

The disclosure concerns a piston pump, in particular as a pressure generator in an electronically slip-controllable vehicle brake system.

Such piston pumps are known from the prior art; for example, reference is made in this respect to the disclosure of EP 1 185 794 B1.

The piston pump (10) shown in the documents presented in FIG. 1 corresponds to this prior art. It comprises a pump cylinder (12) in which a piston (14) is received and guided along a pump longitudinal axis L. The piston (14) can be driven by a rotating eccentric or cam (16) into a reciprocating motion against the returning force of a piston spring (44). Together with the pump cylinder (12), the piston (14) delimits a pump working chamber (18), the volume of which increases or decreases depending on the piston movement direction. A pump outlet (20) opens from the pump working chamber (18). To control a flow of pressure medium through the piston pump (10), amongst others an outlet valve (22) is provided. This controls an opening cross section of the pump outlet (20) depending on the pressure in the pump working chamber (18), and for this purpose has a closing member (26) which is loaded by an elastic return means (24). Said closing member cooperates with a conical valve seat (28). A ball for example is used as a closing member (26) of the outlet valve (22).

The valve seat (28) is arranged at a base closing the pump cylinder (12) at one end, and is formed on the side of this base facing away from the pump working chamber (18).

In the closed state of the outlet valve (22) depicted, the ball plunges in portions so far into a valve chamber (30) surrounded by the valve seat (28) that the ball portion lying outside the valve chamber (30) is significantly larger than the ball portion lying inside the valve chamber.

Accordingly, an imaginary center point (M) lies outside or downstream of the valve chamber (30) viewed in the flow direction of the outlet valve (22).

For axial guidance during its reciprocating motion, the known closing member (26) plunges into a bore (32) which is formed as a blind bore on a sealing plug (34). The sealing plug (34) closes a receiving opening (36) for the piston pump in a pump housing (38). A diameter of the bore (32) is slightly larger than the diameter of the closing member (26). Furthermore, the bore (32) serves to receive the return means (24) of the closing member (26). This return means (24) is configured as a coil spring and loads the closing member (26) with a spring force acting in the direction of the valve seat (28).

In addition, a pump outflow channel (40) is formed on the end of the sealing plug (34) facing the base of the pump cylinder (12). This pump outflow channel (40) is formed by a groove which is open towards the pump cylinder (12) and runs transversely to the pump longitudinal axis L.

The pressure medium conveyed through the outlet valve by the piston pump (10) flows through the pump outflow channel (40). The pump outflow channel (40) is positioned geometrically at a height between the valve seat (28) and the imaginary center point M of the closing member (26).

These geometric conditions have substantial influence on the function properties of the outlet valve (22) described. Amongst others, they determine the valve curve, i.e. the pressure medium throughput through the outlet valve (22) as a function of a pressure difference loading the closing member (26), the opening pressure of the outlet valve (22), and the valve noise which occurs on opening and closing of the outlet valve (22).

In particular, a high throughflow of pressure medium and little valve noise are of essential importance in view of the constantly rising demands for a possible pressure build-up dynamic and comfort of a vehicle braking system. In this context, reference is made to assistance functions such as e.g. automated driving, emergency braking function or similar, which are implemented by the vehicle braking system, largely sensor-controlled and without or with only limited driver involvement.

SUMMARY

In comparison with the prior art outlined above, the disclosed piston pump has the advantage that the opening forces of its outlet valve may be reduced, the flow guidance through the outlet valve improved and hence the pressure medium throughput of the outlet valve increased, and the valve noise reduced. These effects result from an optimization according to the disclosure of the geometric ratios between the diameter of the pump outlet, the seat angle and the seat depth of the valve seat, the dimensions of the closing body matched thereto, and the arrangement of the pump outlet. The reduced choke effect of the outlet valve diminishes the pump internal pressure which is set under operating conditions, minimizes the load on the pump components and consequently increases pump reliability. Furthermore, less drive power is required to drive the piston pump, which again has a cost-reducing effect on the components of the pump drive, in particular the drive motor and/or its control electronics.

Further advantages or advantageous refinements of the disclosure arise from the subclaims and/or the description which follows.

BRIEF DESCRIPTION OF THE DRAWINGS

The disclosure is depicted in the drawing as an exemplary embodiment and is explained in more detail in the following description.

As already stated.

Figure 1:
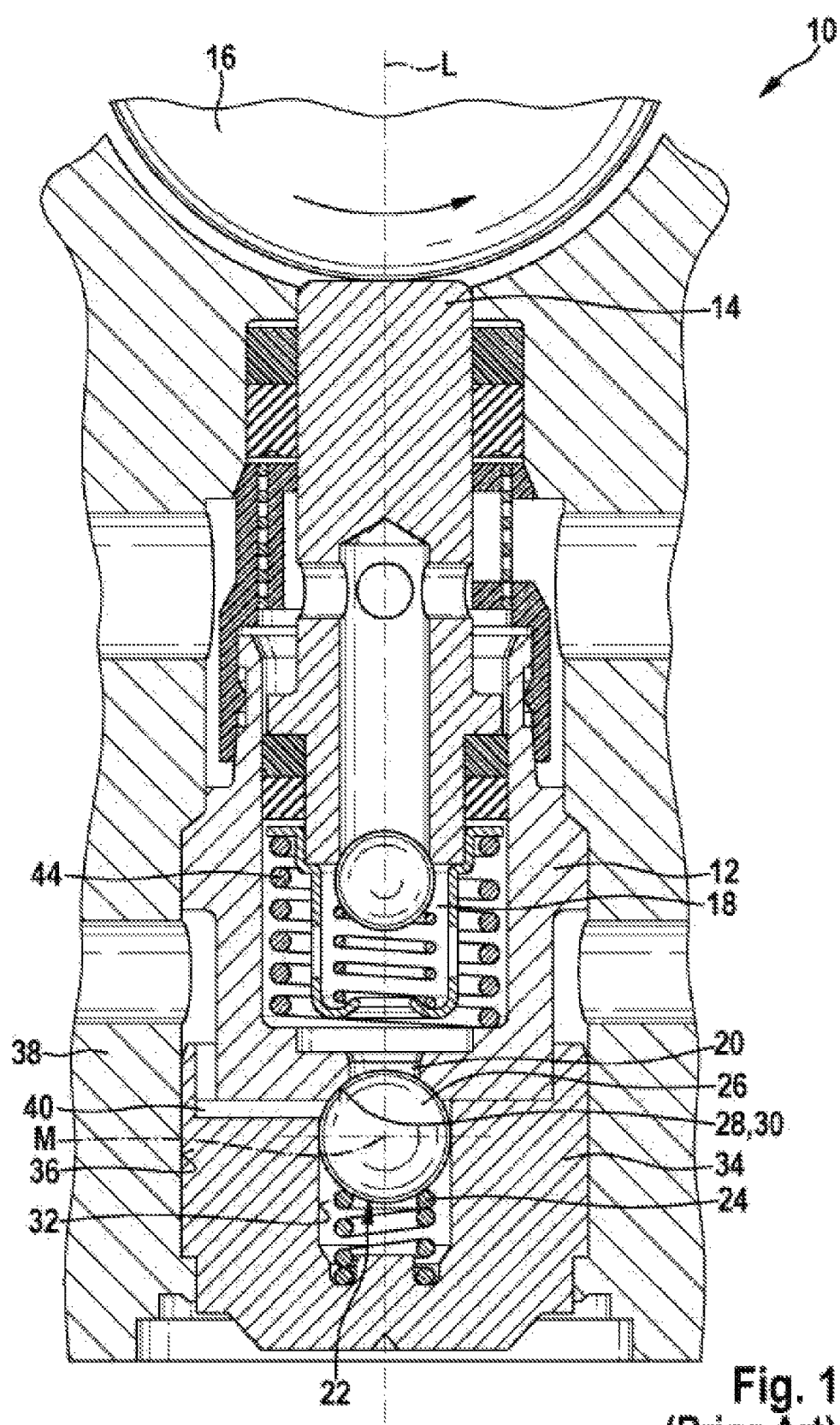
FIG. 1 shows a piston pump known from the prior art in longitudinal section.
Figure 2:
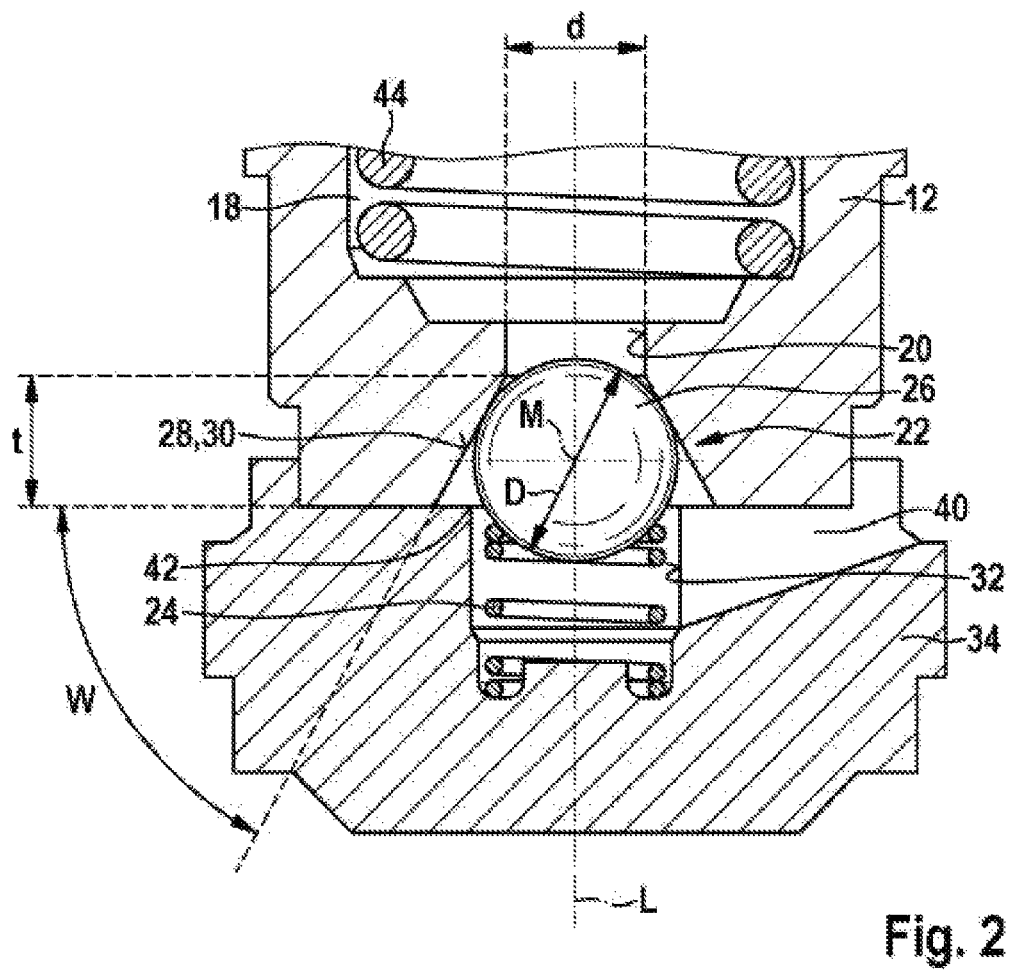
FIG. 2, also in longitudinal section, shows an extract from a piston pump which is fitted with an outlet valve configured according to the disclosure.

The same reference signs are used for corresponding components in FIGS. 1 and 2.

DETAILED DESCRIPTION

According to FIG. 2, in order to control the cross section of a pump outlet 20 of a piston pump 10, an outlet valve configured according to the disclosure, similarly to the prior art outlined above, also has a valve seat 28, a closing member 26 and an elastic return means 24 loading the closing member 26 in the direction of the valve seat 28. In FIG. 2, a ball is used as the closing member 26, wherein the use of a ball is not absolutely essential to the disclosure. Also for example, a closing member 26 would be conceivable which has e.g. a cylindrical shaft and a domed portion at least on the end of this shaft which cooperates with the valve seat 28 in order to control the pump outlet 20. Also, according to FIG. 2, a coil spring is provided as an elastic return means 24 for loading the closing member 26. Alternatively, other spring types e.g. conical, cup or pocket springs could be used, as could volume-elastic components made from elastomer or elastomer foam.

The return means 24 of the closing member 26 is arranged in a bore 32 of a sealing plug 34 which closes a receiving bore 36 of a pump housing (not shown in FIG. 2) against the environment. One end of the sealing plug lies on a base of the pump cylinder 12. The pump cylinder 12 together with a piston (not shown in FIG. 2) delimits a pump working chamber 18. A piston spring 44 which returns the piston (not shown) is arranged in the pump working chamber 18. The pump outlet 20, the cross section of which is controlled by the outlet valve 22, is located approximately centrally on the base of the pump cylinder 12.

FIG. 2 furthermore shows a pump outflow channel 40. This opens from the sealing plug 34 in the region of the wall of the bore 32 of same, and extends substantially transversely to a pump longitudinal axis L. The pump outflow channel 40 has its maximum channel cross section at the point at which it opens into the bore 32, i.e. as the distance from the opening point increases, the channel cross section of the pump outflow channel 40 continuously diminishes.

The pump outlet 20 opens out of the pump working chamber 18. This has a constant outlet diameter d. In the flow direction of the pressure medium through the outlet valve 22, this pump outlet 20 is directly adjacent to the valve seat 28. The latter is formed conical so that its throughflow cross section widens continuously in the flow direction of the pressure medium from a minimum cross section to a maximum cross section. Between the minimum cross section and the maximum cross section, the valve seat 28 circumferentially surrounds a valve chamber 30. The valve seat 28 has a seat angle w and extends in the direction of the pump longitudinal axis L, from the pump outlet 20 to the end face of the pump cylinder 12 adjacent to the sealing plug 34. The shortest distance between the minimum and maximum cross section of the valve seat 28 is known as the seat depth t. The spherical closing member 26 has a closing member diameter D. The latter is matched to the seat depth t, the pump outlet diameter d and the seat angle w such that the closing member 26 plunges so far into the valve chamber 30 surrounded by the valve seat 28 that an imaginary center point M of the closing member 26 is situated inside the valve chamber 30. The position of the center point M of the closing member 26 is illustrated in FIG. 2 by the point at which a longitudinal axis and a transverse axis through the closing member 26 intersect. The center point M of the closing member 26 is situated inside the valve chamber 30, irrespective of whether the valve seat 28 is closed or opened by the closing member 26. When the valve seat 28 is in the open state, the pressure medium flowing out of the pump outlet 20 flows around the closing member 26, thus centering it in the valve chamber 30.

With regard to pressure medium throughflow, flow resistance and operating noise, particularly advantageous results have been obtained with a closing member diameter D between 3.0 mm and 3.5 mm in conjunction with a seat angle w between 55° and 65°, a seat depth t with a length between 75% and 95%, and a pump outlet with an outlet diameter d in the region between 65% and 80%, all in relation to the closing member diameter D.

Because of the geometric conditions, according to the disclosure the pump outlet flow channel 40 is now arranged, viewed in the throughflow direction of the outlet valve 22, downstream of the imaginary center point M of the closing member 26.

Furthermore, the outlet valve according to the disclosure cooperates with a ring shoulder 42 which is preferably formed rectangular and is situated at the transition from the valve seat 28 to the sealing plug 34. This ring shoulder 42, viewed in the throughflow direction of the outlet valve 22, also lies downstream of the imaginary center point M of the closing member and has an outer diameter which is determined by the maximum cross section of the conical valve seat 28, and an inner diameter which is established by the outer diameter of the bore 32 of the sealing plug 34. According to the disclosure, the outer diameter of the ring shoulder 42 amounts to around 120% to 130% of its inner diameter.

The point at which the pump outflow channel opens into the bore 32 of the sealing plug 24 is directly adjacent to the ring shoulder 42. This bore 32 is preferably formed as a blind hole and has a diameter which is only slightly larger than the diameter D of the closing member 26, although in the disclosure, the closing member 26 does not plunge into the bore 32 under operating conditions.

The closing member 26 is guided or centered in the pump cylinder 12 in particular by the valve seat 28 formed thereon and the pressure medium flowing through this valve seat 28.

Evidently, changes and/or additions to the exemplary embodiment described are conceivable without deviating from the subject according to the features disclosed herein. In this context, it is pointed out that the disclosure is described merely as an example with reference to an outlet valve of a piston pump, but in principle however would also be transferable to the inlet valve.

The invention claimed is:

1. A piston pump comprising:
   a pump cylinder;
   a drivable piston displaceably received in the pump cylinder;
   a pump working chamber delimited by the drivable piston and by the pump cylinder;
   a valve chamber;
   a valve configured to control a flow of pressure medium from the pump working chamber, the valve including a conical valve seat surrounding the valve chamber and a closing member having a domed portion configured to cooperate with the conical valve seat, the closing member configured such that, in both an open position of the valve and a closed position of the valve, an imaginary center point of the domed portion is arranged in the valve chamber;
   a pump outflow channel arranged downstream of the imaginary center point of the domed portion of the closing member; and
   an annular shoulder arranged in a region between the imaginary center point of the closing member and the pump outflow channel in a flow direction of the valve, the annular shoulder having an outer diameter defined by a cross-section of the conical valve seat and an inner diameter defined by an outer circumference of a bore in which a return member for the closing member is received, wherein the pump outflow channel extends transversely to a longitudinal axis of the piston pump and opens into an interior of the piston pump immediately adjacent to the annular shoulder.

2. The piston pump as claimed in claim 1, further comprising:
a pump outlet that opens from the pump working chamber,
wherein the valve is configured to control a cross-section of the pump outlet.

3. A piston pump comprising:
a pump cylinder;
a drivable piston displaceably received in the pump cylinder;
a pump working chamber delimited by the drivable piston and by the pump cylinder;
a valve chamber; and
a valve configured to control a flow of pressure medium from the pump working chamber, the valve including a conical valve seat surrounding the valve chamber and a closing member having a domed portion configured to cooperate with the conical valve seat, the closing member configured to plunge into the valve chamber at least up to an imaginary center point of the domed portion when the conical valve seat is closed and open, wherein:
the closing member is configured as a ball having a diameter between 3.0 mm and 3.5 mm;
the conical valve seat includes a seat angle between 55° and 65° and a seat depth having a seat depth length; and
the seat depth length is 75% to 95% of the diameter of the closing member.

4. The piston pump as claimed in claim 2, wherein the pump outlet has a pump outlet diameter between 65% and 80% of the diameter of the closing member.

5. The piston pump as claimed in claim 1, wherein the pump outflow channel has a channel cross-section which decreases continuously with an increasing distance from a point at which the pump outflow channel opens into the interior of the piston pump.

6. The piston pump as claimed in claim 1, wherein the piston pump is a pressure generator in an electronically slip-controllable vehicle brake system.

7. The piston pump as claimed in claim 1, wherein the conical valve seat has valve seat walls that are oriented at an angle of between 55° and 65° relative to the longitudinal axis of the piston pump.

* * * * *